United States Patent [19]
Ogura

[11] 3,896,759
[45] July 29, 1975

[54] SHIFT LEVER POSITION INDICATOR FOR MOTOR VEHICLE AUTOMATIC TRANSMISSION SYSTEM

[75] Inventor: Hisateru Ogura, Yokohama, Japan

[73] Assignee: Nissan Motor Company Limited, Japan

[22] Filed: Apr. 26, 1974

[21] Appl. No.: 464,672

[30] Foreign Application Priority Data
May 31, 1973  Japan.................................. 48-63361

[52] U.S. Cl............................ 116/124 R; 116/129 H
[51] Int. Cl.............................................. G09f 9/00
[58] Field of Search...... 116/DIG. 20, 115.5, 129 R, 116/129 E, 129 H, DIG. 21, 124 R, 124 AT; D12/179; 74/473 R, 475, 491, 523

[56] References Cited
UNITED STATES PATENTS

| | | |
|---|---|---|
| 3,084,659 | 4/1963 | Griffin........................ 116/124 AT |
| 3,231,857 | 1/1966 | Miller.......................... 116/124 AT |
| 3,524,979 | 8/1970 | Cohen.......................... 116/124 AT |
| D213,747 | 4/1969 | Ross................................ D12/179 |

*Primary Examiner*—S. Clement Swisher
*Assistant Examiner*—Denis E. Corr
*Attorney, Agent, or Firm*—Robert E. Burns; Emmanuel J. Lobato; Bruce L. Adams

[57] ABSTRACT

A shift lever position indicator for a motor vehicle automatic transmission system, which comprises a casing coupled with the shift lever and having at its upper wall an aperture through which a character representing a selected driving range can be observed. The character is illuminated by light rays emitted from a light source positioned within the casing.

2 Claims, 3 Drawing Figures

PATENTED JUL 29 1975 3,896,759

SHEET 1

PATENTED JUL 29 1975

3,896,759

SHEET 2

SHIFT LEVER POSITION INDICATOR FOR MOTOR VEHICLE AUTOMATIC TRANSMISSION SYSTEM

The present invention relates to a motor vehicle automatic transmission system and more particularly to a shift lever position indicator for a motor vehicle automatic transmission system.

The shift lever position indicator is so arranged as to indicate the control position of the shift lever which is connected to the manual selector valve spool. The control positions of the shift lever respectively correspond to the driving ranges such as parking (P), reverse (R), neutral (N), drive (D), second speed (2) and first speed (1) ranges.

The conventional shift lever position indicator includes an indicating member movable along indicating figures such as P, N, D, 1 and 2 arranged in order, in accordance with movement of the shift lever.

It has been a problem in the conventional shift lever position indicator that the operator has not been able to correctly distinguish the position of the shift lever.

It is therefore a principal object of the present invention to provide a new and improved shift lever position indicator, which can clearly indicate the position of shift lever.

It is another object of the present invention to provide a new and improved shift lever position indicator which is simple in construction and economical.

The features and advantages of the shift lever position indicator of the present invention will become more apparent from the following description taken in conjunction with the accompanying drawings in which like reference numerals and characters designate corresponding parts throughout the figures and in which.

Figure 1:
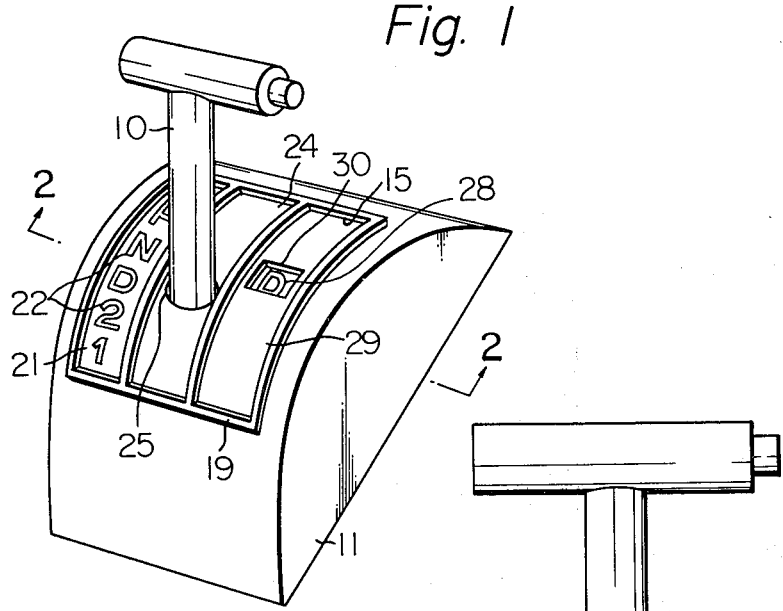
FIG. 1 is a perspective view of a shift lever position indicator according to the present invention.
Figure 2:
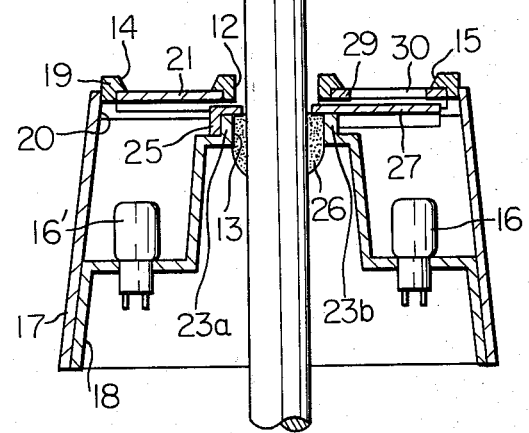
FIG. 2 is a sectional view taken along the line 2—2 shown in FIG. 1.
Figure 3:
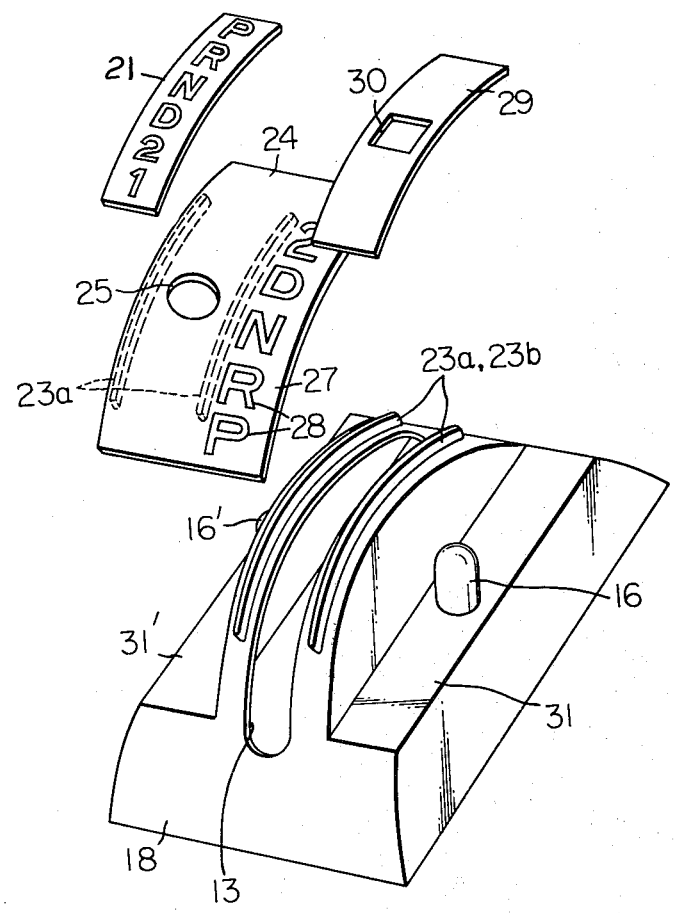
FIG. 3 is a diagram showing various parts of the shift lever position indicator of FIG. 1.

Referring now to the accompanying drawings, it will be seen a shift lever position indicator according to the present invention which comprises a shift lever 10 connected through a suitable mechanical linkage (not shown) to the manual selector valve spool of an automatic transmission system, so that the driving range of the automatic transmission system is selected by positioning the shift lever 10. A casing 11 is coupled with the shift lever 10 through its central slots 12 and 13 coextensively formed at its upper and bottom walls. The casing 11 is to be mounted on the inner wall of the vehicle cabin so that the shift lever 10 moves through the central slots 12 and 13 in the longitudinal direction of the slots 12 and 13. The casing 11 further has at its upper wall a pair of elongated side windows 14 and 15 extending along the central slot 12. A pair of lamps 16 and 16' mounted on the bottom wall of the casing 11 are positioned beneath the respective elongated side windows 14 and 14. The lamps 16 and 16' are connected to an electric power source (not shown) through a suitable switching circuit (not shown). The lamps 16 and 16' are desirably energized through a switching operation of the switching circuit. The lamps 16 and 16' may be replaced by only one lamp which is suitably positioned within the casing 11 and in this case, the geometry of the bottom wall of the casing 11 may be changed. The casing 11 is preferably constituted by outer and inner recessed plate members 17 and 18 snugly coupled with each other. The central slot 12 and elongated side windows 14 and 15 are preferably defined by a frame 19 snugly fitted with an opening 20 formed in the upper wall of the outer recessed member 17. An opaque patterned plate member 21 is snugly fitted with the elongated side window 14, the patterned plate member 21 having transparent patterned portions 22 representing the respective control positions such as P, R, N, D, 2 and 1. The patterned plate member 22 may be made of an acrylic resin. A pair of guide rails 23a and 23b are formed at longitudinal edge portions of the central slot 13 and the guide rails 23a and 23b comprise suitable guide means. The longitudinal edge portions of the central slot 13 are preferably inwardly recessed and arcuated as being clearly seen from FIG. 3. An elongated blind and slide plate member 24 is slidably mounted on the guide rails 23a and 23b, the blind and slide plate member 24 being slidable along the longitudinal direction of the central slot 13 and having a length about twice as long as that of the longitudinal length of the central slot 13 so that the plate member 24 can blind or cover the central slot 13 even when it is placed at an extreme position. The blind and slide plate member 24 has an opening 25 at its central portion into which the shift lever 10 is inserted so that the blind and slide member 24 moves in accordance with movement of the shift lever 10. A seal member 26 is preferably mounted on the shift lever 10 so as to seal between the shift lever 10 and the edge of the opening 25. An opaque indicating plate member 27 is connected and preferably integral with the blind and slide plate member 24. The indicating plate member 27 has transparent patterned portions 28 representing the respective control position, the transparent patterned portions 28 being arranged beneath the elongated side window 15 in a direction inverse to that of the transparent portions 22. An opaque apertured plate member 29 is snugly fitted with the elongated side window 15 and having an aperture 30 with substantially the same extent as that of each transparent patterned portion 28. The aperture 30 is formed at such a portion as to allow one of the transparent patterned portions to be exposed to the outside of the casing 11. The bottom wall of the member 18 around the lamps 16 and 16' is preferably terraced, as indicated by 31 and 31', and colored in white so as to allow the light rays emitted from the lamps 16 and 16' to be effectively utilized.

When, with the above-stated arrangement, the shift lever 10 is shifted, the blind and slide plate member 24 and indicating plate member 27 are also shifted, whereby one of the transparent patterned portions 28 is exposed to outside through the aperture 30. The exposed transparent patterned portion corresponding to a selected driving range. Thus, the operator can select the control position while referring to the patterned portions 22 and can confirm the selected position by observing the pattern exposed through the aperture 30.

It should be noted that the transparent patterned portions 22 and/or 28 may be colored by means of a fluorescent red paint and the remaining portion of the plate members 21 and 27 may be colored in white or black so as to achieve clear indication.

It is to be noted that the side windows 14 and 15 are made symmetric to each other with respect to the central slot 12 and the plate members 21 and 29 are made to have substantially the same largeness so that the shift lever position indicator of the invention is applicable to both types of vehicle cabins, one having the steering wheel positioned right-hand and the other left-hand, by merely replacing the plate members 21 and 29 by each other.

It will be understood that the invention is not to be limited to the exact construction shown and described and that various changes and modifications may be made without departing from the spirit and scope of the invention, as defined in the appended claims.

What is claimed is:

1. A shift lever position indicator for a motor vehicle automatic transmission system having a manual selector valve spool movable to different control positions, which comprises:

a shift lever adapted to be connected to the manual selector valve spool so that the valve spool is positioned when said shift lever is placed at one of the control positions;

a casing including upper and bottom walls and having at the upper wall thereof a first central slot, and first and second elongated side windows extending along said first central slot and having at the bottom wall thereof a second central slot coextensive with said first central slot, said casing being so positioned as to allow said shift lever to be inserted into said first and second central slots and to be movable along the longitudinal direction of said first and second central slots;

an opaque patterned plate member snugly fitted with said first elongated side window, said patterned plate member having first transparent patterned portions representing the respective control positions, said first transparent patterned portions being ordered along the moving direction of said shift lever;

guide means formed on said the inner surface of the bottom wall of said casing and extending along said second central slot;

a blind and slide member slidably mounted on said guide means and connected with said shift lever so that said blind and slide member slides along the direction of said shift lever in accordance with the movement of said shift lever, said blind and slide member having such an extent as to blind said first central slot;

an opaque indicating plate member connected with said blind and slide member and having second transparent patterned portions representing the respective control positions, said second transparent patterned portions being arranged beneath said second elongated side window in a direction inverse to that of said first transparent patterned portions;

an opaque apertured plate member snugly fitted with said second elongated side window and having an aperture having substantially the same extent as that of each second transparent patterned portion and formed at such a portion as to allow one of said second transparent patterned portions to be exposed outside of said casing;

and at least one energizable light source positioned within said casing so that said light source irradiates light rays emitted from it when it is energized.

2. A shift lever position indicator according to claim 1, in which said casing has said first and second elongated side windows symmetric to each other with respect to said first central slot, and in which said opaque patterned plate member and said opaque apertured plate member have substantially the same size.

* * * * *